US005692225A

United States Patent [19]
Bernardi et al.

[11] Patent Number: 5,692,225
[45] Date of Patent: Nov. 25, 1997

[54] VOICE RECOGNITION OF RECORDED MESSAGES FOR PHOTOGRAPHIC PRINTERS

[75] Inventors: Bryan David Bernardi, Rochester; Dale Frederick McIntyre; Dana Whitney Wolcott, both of Honeoye Falls, all of N.Y.

[73] Assignee: Eastman Kodak Company, Rochester, N.Y.

[21] Appl. No.: 298,101

[22] Filed: Aug. 30, 1994

[51] Int. Cl.⁶ .............................. G03B 29/00; G03B 17/24
[52] U.S. Cl. .......................... 396/318; 396/315; 396/312; 396/310
[58] Field of Search .............................. 354/75, 76, 105, 354/106; 396/310, 312, 315, 318

[56] References Cited

U.S. PATENT DOCUMENTS

| | | | |
|---|---|---|---|
| 2,950,971 | 8/1960 | Lewin | 430/140 |
| 3,439,598 | 4/1969 | Weitzner et al. | 95/12 |
| 4,270,853 | 6/1981 | Hatada et al. | 354/76 |
| 4,270,854 | 6/1981 | Stemme et al. | 354/76 |
| 4,344,682 | 8/1982 | Hattori | 354/62 |
| 4,389,109 | 6/1983 | Taniguchi et al. | 354/60 L |
| 4,443,077 | 4/1984 | Tanikawa | 354/21 |
| 4,613,911 | 9/1986 | Ohta | 360/3 |
| 4,642,717 | 2/1987 | Matsuda et al. | 360/105 |
| 4,742,369 | 5/1988 | Ishii et al. | 354/441 |
| 4,905,029 | 2/1990 | Kelley | 354/76 |
| 4,951,079 | 8/1990 | Hoshino et al. | 354/412 |
| 4,965,626 | 10/1990 | Robison et al. | 355/40 |
| 4,977,419 | 12/1990 | Wash et al. | 354/76 |
| 4,983,996 | 1/1991 | Kinoshita | 354/76 |
| 5,023,635 | 6/1991 | Nealon | 354/76 |
| 5,025,283 | 6/1991 | Robison | 355/40 |
| 5,027,149 | 6/1991 | Hoshino et al. | 354/412 |
| 5,070,355 | 12/1991 | Inoue et al. | 354/413 |
| 5,097,278 | 3/1992 | Tamamura et al. | 354/105 |
| 5,099,262 | 3/1992 | Tanaka et al. | 354/106 |
| 5,128,700 | 7/1992 | Inoue et al. | 354/76 |
| 5,142,310 | 8/1992 | Taniguchi et al. | 354/106 |
| 5,146,249 | 9/1992 | Hoda et al. | 354/21 |
| 5,160,952 | 11/1992 | Iwashita et al. | 354/76 |
| 5,245,372 | 9/1993 | Aoshima | 354/106 |
| 5,276,472 | 1/1994 | Bell et al. | 354/76 |
| 5,313,235 | 5/1994 | Inoue et al. | 354/76 |
| 5,363,158 | 11/1994 | Stoneham | 354/76 |

FOREIGN PATENT DOCUMENTS 0 342 628  11/1989  European Pat. Off. ........ G03B 17/30

OTHER PUBLICATIONS

Patent Abstracts of Japan, Nomura Kazuya, Shutter Driving Device, Jun. 26, 1991, vol. 15, No. 380 (P –1256).

*Primary Examiner*—Safet Metjahic
*Assistant Examiner*—Michael Delakis
*Attorney, Agent, or Firm*—Charles E. Snee, III; David A. Howley

[57] ABSTRACT

In a camera and printer system, apparatus and methods for recording or storing voice messages in message memory associated with an exposed image frame for reproduction as an annotation with prints made from the exposed image frames. The messages may be recorded on magnetic film layers or stored in camera on-board memory or in detachable message memory modules or cards to be forwarded with the exposed film strip to a photofinisher for read out and printing on the prints. The printer includes a voice recognition system for voice recognition of words spoken by the user and stored in the memory means and provided to the photofinisher. The messages to be printed may be stored or recorded by the user in real time with each exposure or at an earlier time to be reproduced on each print made subsequently. Notes may be temporarily stored with the making of each exposure, read out at a later time and used in the composition and recording in the memory of the message to be printed after voice recognition. Alternatively, or in addition, the composed messages made from the notes may be manually recorded in machine readable form, and the printer may include a character recognition system for reading out the recorded words for reproduction as the annotation on the prints.

16 Claims, 8 Drawing Sheets

VOICE RECOGNITION OF RECORDED MESSAGES FOR PHOTOGRAPHIC PRINTERS

CROSS-REFERENCE TO RELATED APPLICATION

Cross-reference is hereby made to commonly assigned U.S. patent application Ser. No. 08/298,014 filed on even date herewith to CAMERA ON-BOARD VOICE RECOGNITION in the names of Dale F. Mcintyre, Bryan D. Bernardi, Clay A. Dunsmore and Dana W. Wolcott.

FIELD OF THE INVENTION

This invention relates to the field of photographic film cameras and film processing, and particularly to a method and apparatus for recognizing stored voice messages relating to film strip image frames and for accurately printing the voice messages as annotations on the prints made from the image frames.

BACKGROUND OF THE INVENTION

A variety of advanced still camera systems have been recently disclosed in which data related to the scenes photographed is input into memory associated with the film strip to be forwarded to the photofinisher to aid in making prints, and, in some instances including messages or annotations to be associated with the prints. As set forth in commonly assigned U.S. Pat. No. 5,276,472, (incorporated herein by reference in its entirety) systems for providing voice recording in cameras in association with the exposure of each film image frame have become known in the art. In the '472 patent, a system is provided for recording a message in transparent magnetic film tracks in a magnetics-on-film (MOF) layer on the non-emulsion side of the film overlying the image frame area. The user may speak words into a camera microphone/speaker that are processed into digital signals stored temporarily in memory. When the message is completed, the user may command the camera to play it back audibly for review and editing as considered necessary. When the message content is considered satisfactory, the digitized annotation may be recorded in the MOF layer tracks of the exposed image frame during advancement of the film to the next image frame. The user may continue recording messages for each image frame exposed, and the fully exposed film is processed so that the resulting prints carry the annotations corresponding to the messages recorded.

The '472 patent is directed to such a system where the coding of each message on the associated print is done during the photofinishing operation in such a way that the machine readable coded information allows the audible reproduction of the message through the use of a special hand-held scanner. The coded information is in the form of a bar code, a blister spot pattern or the like that may be scanned and translated into an audio voice reproduction by the hand-held scanner moved over the coded information.

The system disclosed in the '472 patent thus simply phonetically processes the speech that is recorded into coded information, and the hand-held scanner phonetically reproduces the words. A brief, alphanumeric place and date annotation may also be printed in the border of the print by the user or the photofinisher from listening to and manually transcribing the recorded message. The quality and accuracy of reproduction of the message depends on how carefully and clearly the words are spoken by the user during the editing and re-recording operation.

In order to store such information, as well as the image frame identification to which it pertains, and other information automatically entered from the camera operating system or optionally entered by the camera user, it is necessary to employ such a further writable and readable media in association with either the film (as disclosed in the '472 patent) or in some other storage media or memory.

With respect to recording camera operating conditions and time and date for each image frame exposure other than on the film itself, it has been proposed to magnetically read and write data on magnetic strips formed on the sides or an end of the film cartridge, as described, for example, in U.S. Pat. No. 4,443,077. More recently, it has been suggested that such data may be stored and retrieved from non-volatile memory chips, e.g. an EEPROM, incorporated in an integrated circuit chip "card" as set forth in U.S. Pat. No. 5,128,700. The card may be separable from the camera and film cartridge, or a similar EEPROM card may be attached to the film cartridge as set forth generally in U.S. Pat. No. 5,070,355. Alternatively, the storage of such information in "ROM-ICs" attached permanently or releasably to the sides or ends of film cartridges is disclosed in U.S. Pat. No. 5,142,310.

The '700 patent also stores sound or voice messages related to the image frames in the removable sound cards that are intended to accompany the film when it is sent in for processing. So that the message may be reproduced, a sound recording is attached to the print made from the negative film image frame to enable phonetic playback of the message. Alternatively, the card itself is read out phonetically. As in the '472 patent, the sound is reproduced phonetically as the coded information or recorded data is scanned.

In another embodiment disclosed in the '700 patent and in a further U.S. Pat. No. 4,344,682, a camera is described for recording information related to each image frame as small alphanumeric characters exposed in a corner portion of the image frame for photographic reproduction on the print made from the negative image frame. The information may be recorded or stored in temporary memory prior to making the exposures of the image frames and exposed on the image frames in conjunction with the image frame exposure. As each message is inputted into memory, it is displayed and may be edited. The input mechanism depicted in the '682 patent is a keyboard, but it is suggested that other input means, including a voice recognition device, may be substituted for the keyboard.

In an electronic still camera disclosed in U.S. Pat. No. 4,742,369, it is also suggested that a keyboard or a voice recognition circuit be employed to input spoken information to be stored regarding each image that is captured by the camera.

In a further camera system, e.g. that disclosed in U.S. Pat. No. 5,027,149, voiced commands are given by the user to command each camera operation. A voice recognition circuit is employed in a system for training the camera to recognize and respond accurately to the spoken commands.

Problems to be Solved by the Invention

It is difficult to accurately reproduce spoken words stored in analog or digital form in a non-photographic media associated with film strip image frames as alphanumeric, readable annotations on the prints made from the image frames. It is desirable to make the reproduction without human inspection of the annotation before it is printed in the image border or other desired location on the print. It is not possible to rely simply on the editing process and careful pronunciation of the words to ensure that they are processed accurately before they are stored for later read out and printing as annotation on the prints made from the exposures.

SUMMARY OF THE INVENTION

It is therefore an object of the present invention to provide a method and apparatus for ensuring the accurate recognition of voice messages that can be accurately reproduced by photofinishing equipment.

It is a further object of the present invention to provide a method and apparatus for ensuring the accurate recognition of spoken words of a message associated with a film strip image frame with minimal or without any human intervention so that the message can be accurately reproduced by photofinishing equipment on prints made from the film strip image frame.

These and other objects of the invention are realized in a photographic print making system for reproducing and recognizing voice messages stored by a user in memory associated with the image frames of a film strip to be printed. The system also includes means for reproducing the stored voice messages, voice recognition means for conducting a voice recognition of the voiced words of the messages and means for printing the alphanumeric characters of the words recognized on the photographic prints made from the image frames with which the voiced messages are associated as a printed annotation.

In accordance with the present invention, a photographic system includes a camera adapted to make exposures of image frames of a film strip and to store voiced messages in memory means associated with the film strip image frames so that both the film strip and memory means are provided to the photofinisher for processing and printing. The system also includes a printer for accurately recognizing the stored messages and printing annotations on prints made from the associated image frames. The system further includes, in the camera, speech input means into which a camera user may speak words of the message to be stored with respect to the filmstrip image frames, and means for storing the voiced words in relation to the film strip image frames in the memory means associated with the film strip. The system still further includes, in the printer, means for providing reference voice data corresponding to a reference word vocabulary, speech recognition means for reading out the stored voice data from the memory means, comparing the read out voice data to the reference voice data, and recognizing reference vocabulary words corresponding to the read out voice data, and means for printing the recognized vocabulary words on the prints made from the associated film strip image frames.

In a preferred embodiment, the message memory means may comprise memory media associated with the film strip and detachable with the film cartridge for transfer to the photofinisher or may remain in the camera if the camera is a single use, recyclable camera returned with the film cartridge to the photofinisher for processing. The memory media preferably comprises a transparent magnetic film layer on the non-emulsion side of the film strip. The sound processing means preferably digitizes the spoken words of the message for each image frame, and the camera storing means magnetically records the digitized words on tracks of the magnetic film layer associated with the film strip image frame. The speech recognition reading means magnetically reproduces the digitized words.

In a further preferred embodiment, the message memory means comprises a memory module with digital memory into which the digitized words are stored in the camera. The memory module accompanies the film strip cartridge for processing in the manner described above.

Preferably, the camera is provided with means for temporarily storing voiced in notes made at the exposure of each image frame and means for reproducing the stored notes so that the user can at a later time compose the message to be printed on each image frame and voice the message for storage in the memory means accompanying the film strip when it is provided to the photofinisher.

In a still further embodiment of the invention, usable in conjunction with the above apparatus and methods or separately, the messages composed to be printed with each image frame are reproduced by the user in a form amenable to optical character recognition. The printer includes an optical character recognition system for optically reading the characters of the words for use by the alphanumeric character printer. When used in association with voice recognition, the user may provide the written words of the messages that may be phonetically ambiguous (voiced words resulting in multiple matches by the voice recognition system) so that the correct spelling may be used.

Advantages of the Invention

The invention advantageously results in the retrieval, word recognition and printing of accurate word annotations on the associated print without requiring a human operator to interpret and correct the message before it is printed.

BRIEF DESCRIPTION OF THE DRAWINGS

These and other objects, advantages and features of the invention will be become apparent from the detailed description given hereinafter in relation to the accompanying drawings, in which.

DETAILED DESCRIPTION OF THE PREFERRED EMBODIMENTS OF THE INVENTION

In accordance with a first aspect of the invention, the printer system includes speech or voice recognition of spoken word messages which are stored in a film strip MOF layer or in a memory module or card and provided to the photofinisher. The above-referenced (Ser. No. 08/298,014) U.S. Pat. No. 5,546,145 is directed to various aspects of a camera having an on-board voice recognition system wherein the voiced words are compared to an on-camera word vocabulary stored in fixed vocabulary ROM and adjustable vocabulary RAM or EEPROM with speaker dependent and/or independent training. This invention is directed to the use of such a camera with on-board voice recognition or a camera without on-board voice recognition with a printer having the voice recognition system for minimizing human operator intervention. In a second aspect of the invention, the printer may additionally or separately be provided with optical character recognition or the like as described hereafter.

Due to the space and power supply limitations inherent in miniaturized still cameras, it is not possible at this time to provide a large scale vocabulary covering all words of a given language in the camera or to provide the processing speed sufficient to effect the comparison of the voice digital data to the memorized word data in a reasonable time period. In the above-referenced (Ser. No. 08/298,014) U.S. Pat. No. 5,349,401, adjustable and fixed vocabularies are proposed and speaker dependent training for certain vocabularies is proposed to economize on vocabulary memory required in the camera.

In the present invention, it is recognized that a computerized photofinishing system for operating a combined photographic and alphanumeric printer need not be limited in vocabulary memory. A large memory capability and high speed search and retrieval during word comparison allows for the storage and use of speaker independent vocabularies developed for other universal applications in the general field of voice recognition. Speaker independent vocabularies provide that each word in a given vocabulary has enough training patterns stored in memory in association with it to distinguish that word from any other word in the vocabulary regardless of the pronunciation of the word by a general population of potential users. The patterns for the various pronunciations of such words are determined in advance and stored for the words of the vocabulary memory unit before it is supplied to the photofinisher. Such words should be recognized by the system when spoken by a fairly broad spectrum of the population.

Figure 1:
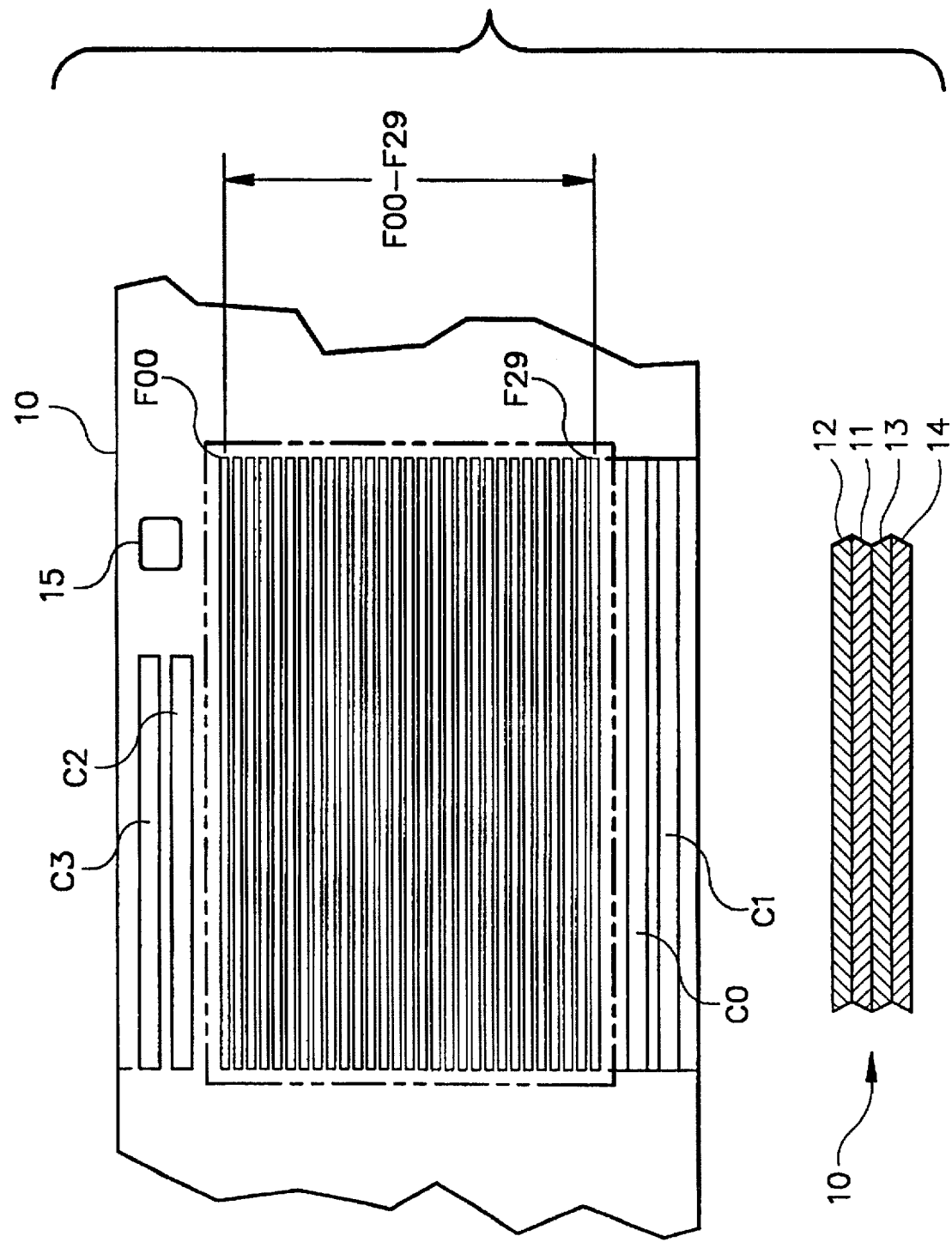
FIG. 1 is a diagram illustrating partial dedicated tracks in a virtually transparent MOF layer and a cross section of the layers of film particularly adapted for use in a camera of a first embodiment of the invention.
Figure 2:
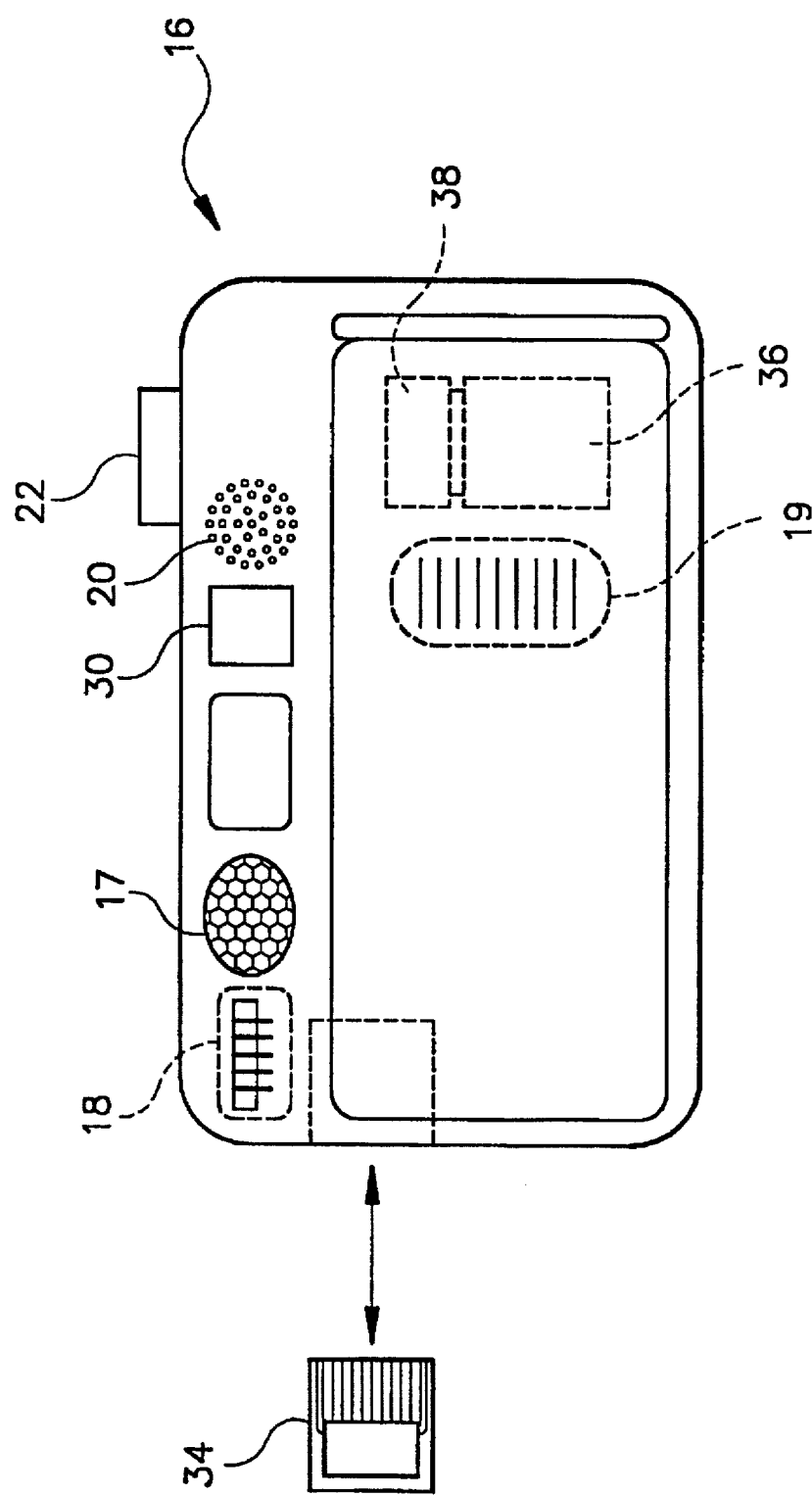
FIG. 2 is a schematic illustration of a camera having speech recording apparatus in accordance with the various embodiments of the invention.
Figure 3:
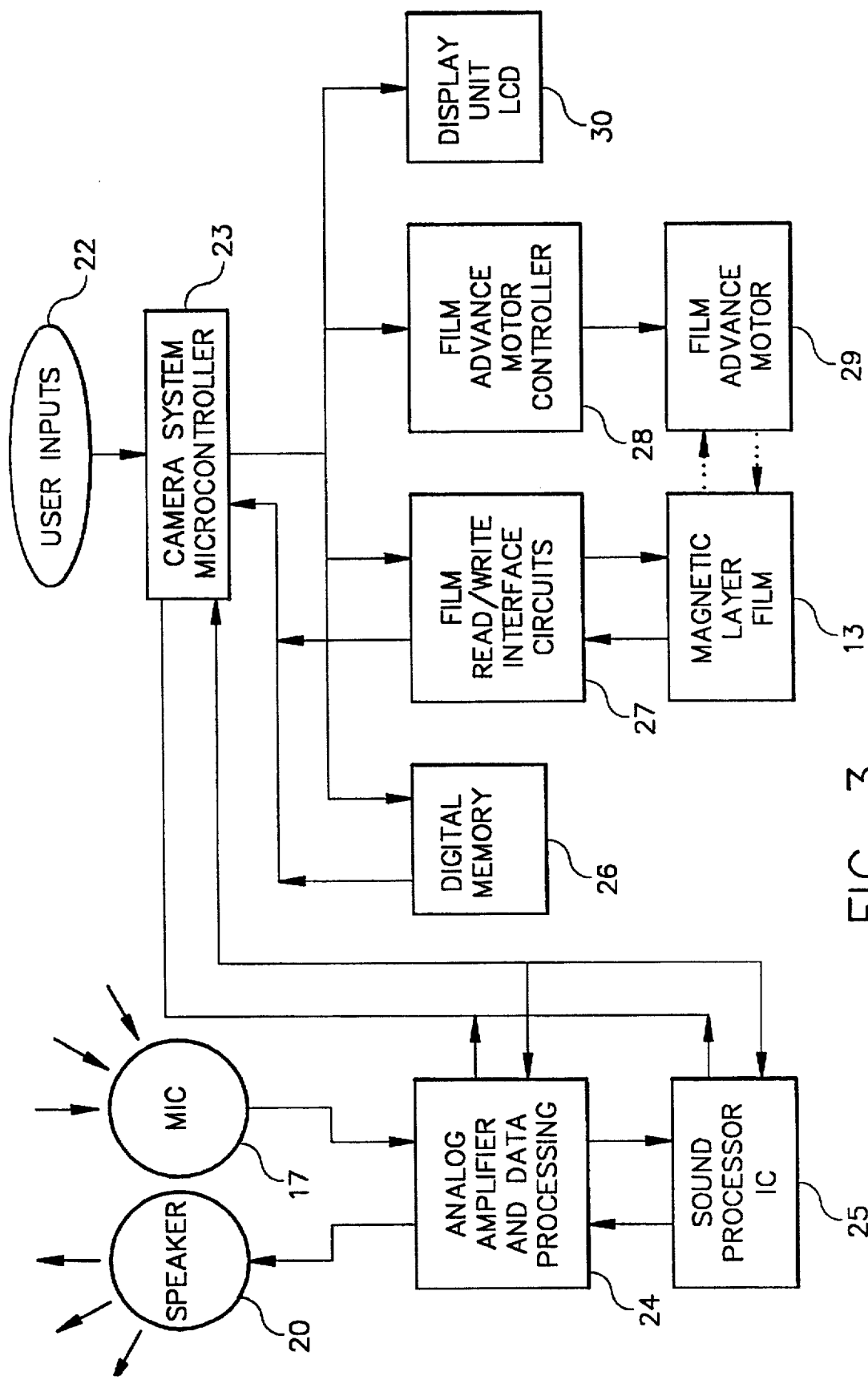
FIG. 3 is a schematic block diagram of a system for recording speech in a camera in accordance with the first embodiment of the invention.

Commencing with the various embodiments of the invention, FIGS. 1 and 2 depict, in conjunction with the camera circuits of FIG. 3, a first embodiment of the invention in which the voiced words may be stored in the MOF layer tracks as digitized data (or as analog signals). In this embodiment, the recognized words are stored in certain of the MOF layer tracks and are read out at the photofinisher employing voice recognition to be printed along with the prints made from the film image frames.

Referring first to FIG. 1, a strip 10 of magnetically coated color negative film, 35 millimeters wide, useful in the present invention includes a base 11, various well-known photo-chemical layers 12 on one side of the base 11 and a virtually transparent MOF layer 13 on the other side. An anti-static and lubricating layer 14 overlies the magnetic layer 13. The film strip 10 includes perforations 15 along the film edge at regular intervals matching the pitch of a metering pawl in a camera adapted to use the film strip 10.

For purposes of recording data in the MOF layer 13, each frame of the film strip 10 may be formatted as shown in FIG. 1 and more fully described in commonly assigned U.S. Pat. No. 4,977,419, the disclosure of which is incorporated herein by reference. More specifically, the frame area is divided into a plurality of predetermined longitudinal track locations designated in the drawing as outermost tracks C0–C4 and innermost tracks F00–F29. As described more fully in the '419 patent, certain of the tracks may be reserved for recording of information in the camera using magnetic recording means included in the camera. In addition, other tracks may be reserved for use by the photofinisher. Additionally, the '419 patent indicates that certain of the tracks may be used for recording of audio information. Apparatus for magnetically recording information in the camera is more fully described in the '419 patent and is not repeated here except to the extent elements thereof are relevant to an understanding of the present invention.

Referring to FIG. 2, a camera 16 is schematically illustrated with a variety of features and components usable separately or in various combinations in the systems and methods described below. In a first embodiment of the invention, the camera 16 is specifically adapted to receive and function with film having the MOF layer 13 of FIG. 1. Camera 16 is provided with a built-in audio transducer, e.g. microphone 17, an internally mounted micro-chip 18, a magnetic recording head 19 and a miniature speaker 20. Camera 16 may also be provided with an LCD panel 30 for displaying various camera settings and conditions of the type well known in the art. Various conventional user inputs 22 are also provided on the camera 16.

FIG. 2 also schematically illustrates a message memory module 38 that may be inserted into a slot or attached to a film cartridge 36 in the camera 16 so that the recording of the image frame related messages may be made in the memory module 38 rather than in the MOF layer of the film strip 10. Such a memory module 38 may take the form of the film cartridge end attached modules of commonly assigned, U.S. Pat. No. 5,394,206 entitled ORIENTATION INDEPENDENT, DETACHABLE FILM CARTRIDGE, MEMORY MODULE filed on Jun. 4, 1993, in the name of J. David Cocca and U.S. Pat. No. 5,546,145 entitled ORIENTATION INDEPENDENT, DETACHABLE FILM CARTRIDGE, MEMORY MODULE filed on Jun. 4, 1993 in the name of Robert S. Bryant.

Alternatively, the memory module into which the messages are recorded may be a plug-in IC card 34 of the type described in the above-referenced '700 patent or the cartridge mounted ROM-ICs described in the above-referenced '310 patent or any other convenient form. The separate message memory card 34 that may be inserted into a slot connector in the camera body and coupled with the on-board microchip 18.

FIG. 2 is a simplified camera 16 from the camera of the corresponding FIG. 2 of the above referenced (Ser. No. 08/298,014) U.S. Pat. No. 5,546,145, wherein on-board voice recognition is incorporated. It will be understood that such a camera may also be used in the practice of the present invention to ensure absolute reliability in recognition of the stored messages.

The means and methods for providing a message memory or for recording the voiced word messages in memory supplied with the film cartridge to the photofinisher described in the preceding paragraphs are depicted redundantly in FIG. 2. It will be understood that not all of these means or methods are necessarily present in a single camera.

Referring to FIG. 3, there is shown an expanded block diagram of a first embodiment of the circuits and components or system included in camera 16 for recording messages in MOF layer 13. User inputs 22 comprise buttons or switches which condition the camera system microcontroller 23 to initiate and control the various operating functions of the camera, including the sound recording and playback functions employed in the present invention, as well as the conventional camera auto focus and auto exposure functions, shutter release, film advance and the like.

Microphone 17 and speaker 20 are coupled to analog amplifier and data processing circuit 24 to input and play back the voiced message in one mode of operation of the circuit. A sound processor integrated circuit (IC) 25 serves to convert analog signals input from microphone 17 into coded digital information suitable for storage in an on-board digital memory 26 and for converting the stored digital information into analog signals suitable for playback through speaker 20. Sound processor 25 may be a Texas Instruments TMS3477, and memory 26 may be a random access memory (RAM) such as a Hitachi HM 628128.

Another function of on-board memory 26 is to serve as a temporary storage for the message associated with an individual exposed image frame after voice recognition is completed and prior to recording the message on the MOF layer 13 of film strip 10. For this purpose, memory 26 is coupled by the microcontroller 23 in the "write" mode to film read/write interface circuits 27 to record the stored audio data onto the MOF layer 13. A film advance motor controller 28 operates at appropriate times to cause film advance motor 29 to advance the film 10 in either the frame-to-frame direction or in the film prewind/rewind direction, the latter depending on the nature of the camera involved. The messages in memory 26 are recorded in the MOF layer tracks during such film advancement.

Figure 4:
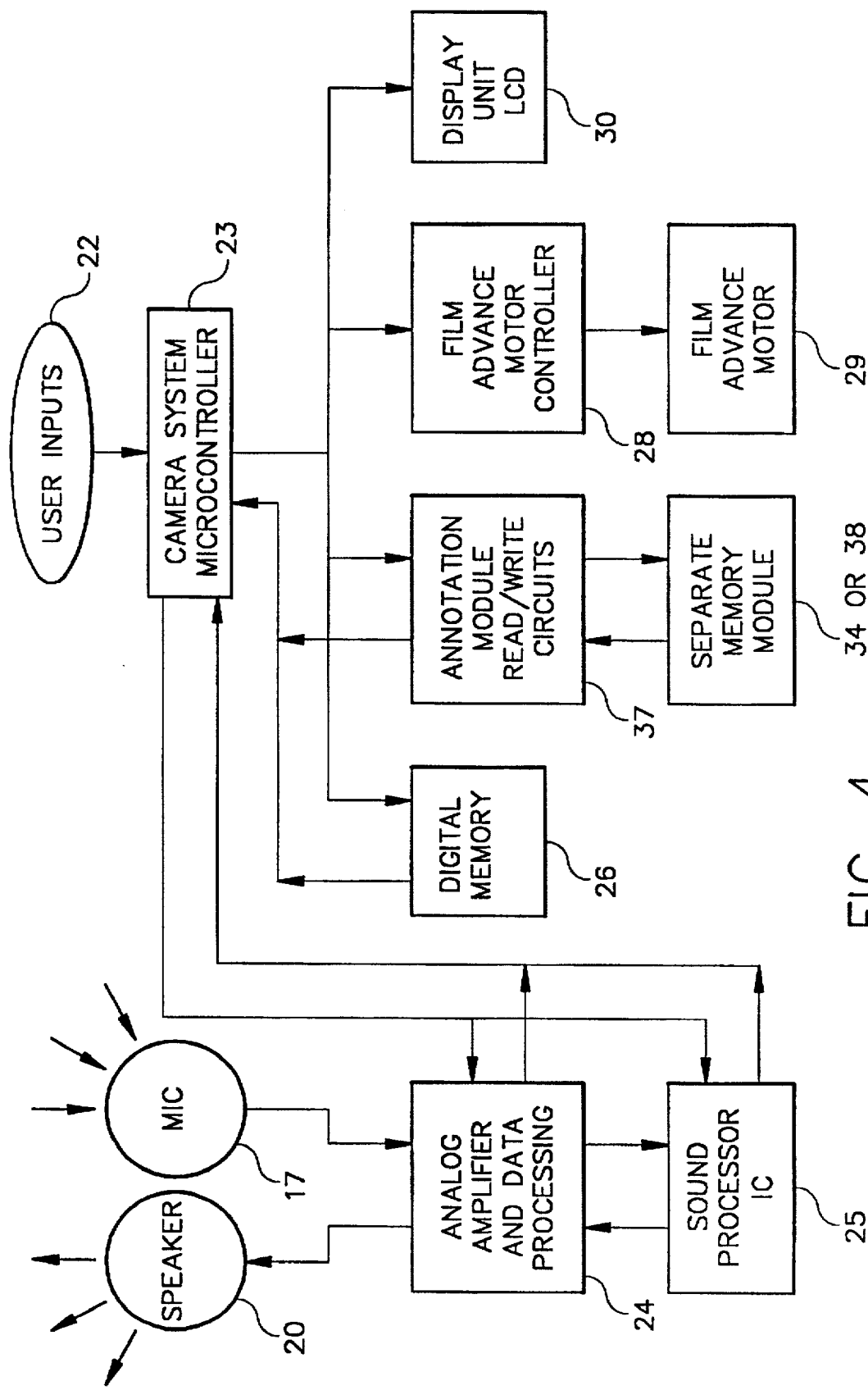
FIG. 4 is a schematic block diagram of a system for recording speech in a camera in accordance with the second embodiment of the invention.

FIG. 4 depicts a further embodiment employing camera circuits similar to FIG. 3 but for recording the voiced words as digital data in a separate memory module 38 or IC-EEPROM card 34, rather than on the MOF layer of FIG. 1, as described above and with reference to FIG. 2.

The general operation of a camera embodying any of the above described embodiments and variations when it is desired to record sound in association with taking a picture, is now described. The camera user selects a sound recording mode via a user input selector switch 22 that causes the camera system microcontroller 23 to set the digital memory to the "write" mode and then enables the analog amplifier and data processing circuit 24 for audio recording. Assuming that the user desires to record image-related audio, the user talks into the camera microphone 17 to identify the scene with appropriate information, e.g. picture taking location, people in the scene, or other information. The user may also verbally initiate recording of information originating in or under the control of the camera itself, e.g. date and time (from an internal digital clock), f-stop, shutter speed, frame number, and other camera operations. The data processing circuit 24 and sound processor IC 25 convert the incoming analog signal to coded digital data which is then recorded in the digital memory 26. Audio may be recorded into memory 26 in this manner before, during or after the picture-taking event as described further below.

Once having recorded the audio message in memory 26, it is then possible to review the message for content via speaker 20 in the camera. To do this, the user selects the "review" mode by means of a user input 22 which causes the microcontroller 23 to set the memory 26 to the "read" mode thereby enabling the sound processor 25 and the analog amplifier and data processing circuit 24 to play back audio through speaker 20. If the recorded message is not satisfactory, the user can easily change it by simply repeating the recording process described above. This composing and editing process may take place in real time with the exposure of each image frame or before or after making the exposures.

Figure 5:
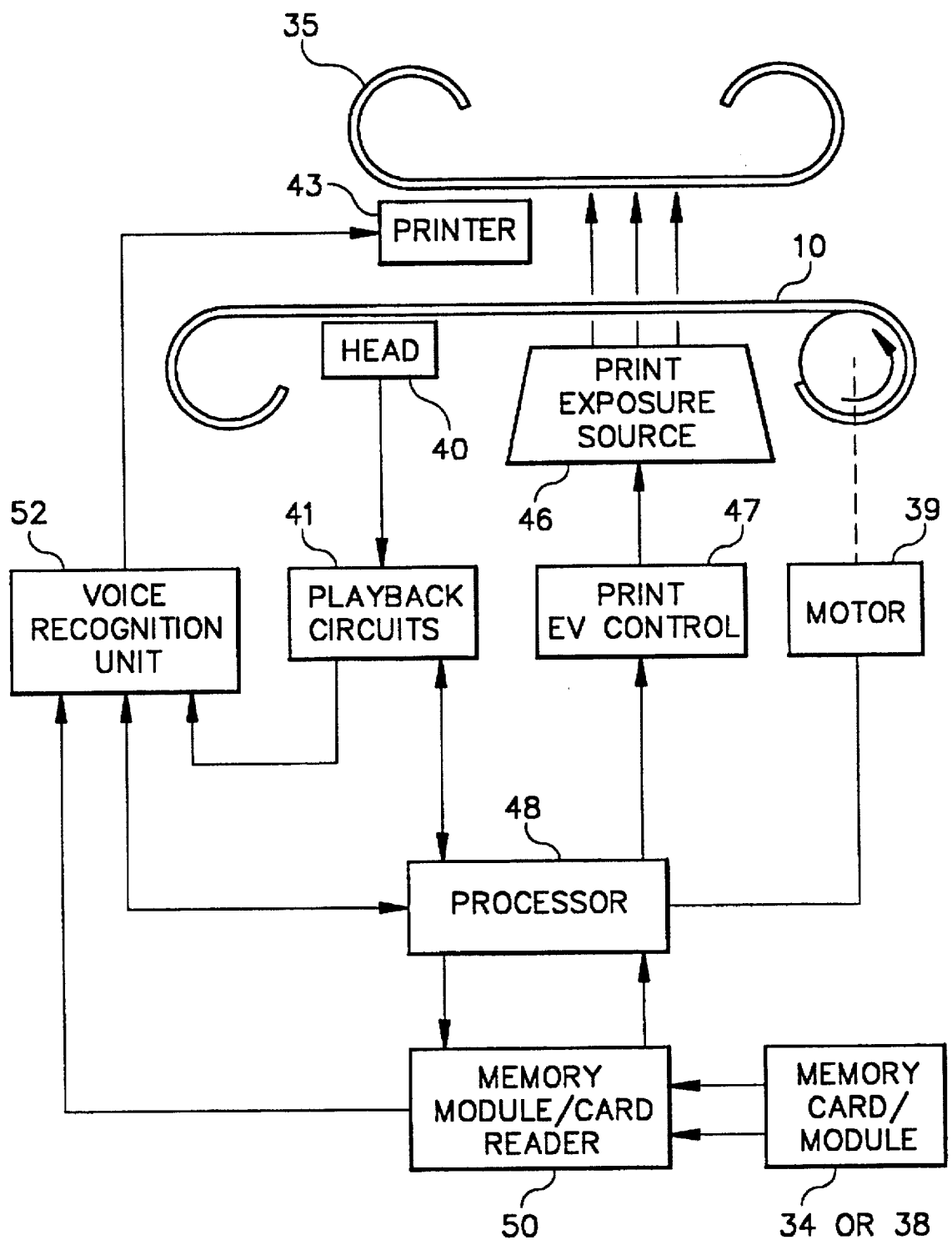
FIG. 5 is a schematic block diagram of a printing system for reading out the stored voice messages relating to each image frame, conducting voice recognition of the stored words and printing the recognized words as annotations on the prints made from the image frames.

The photofinishing system employed to transfer the message to the print is depicted in FIG. 5 and is similar to that depicted in FIG. 4 of the above incorporated '472 patent. In that FIG. 4, the messages recorded in the MOF layer tracks for each image frame are read out and converted to a bar code or blister code format that is imprinted on the print. In the present case, the recorded messages are read out from either the MOF layer tracks or the memory module/card 38/34 provided to the photofinisher with the film cartridge, subjected to voice recognition, and the recognized words are converted (if necessary) to an alpha-numeric character font, and directly printed on the print in any convenient place using any conventional character printer.

The processor 48 governs the timing and control of the film strip image frame drive motor 39 and a similar drive motor (not shown) for the photographic paper strip 35. Processor 37 also controls other conventional photographic printer functions including the print EV control unit 47 and the print head or exposure light source 46.

The read out of the messages recorded in the MOF layer tracks may be accomplished by the head 40 and playback circuits 41 as the film strip 10 is advanced under the control of the processor 48. The processor 48 governs the operation of the playback circuits 41 which may include temporary storage of the read-out word messages if the read-out from the image frame is not in synchrony with the position of the print paper strip area where the corresponding image frame will be printed through operation of the print exposure source 46. At other stages of the printer, the film strip image frames are analyzed to determine the appropriate exposure control parameters, and such data is temporarily stored until the image frame is in the print station, in a manner well known in the art. The image frame number and print frame numbers are tracked by the processor 48 to ensure synchrony in these processes.

A memory card/module reader 50 is also coupled to the processor 48 and the voice recognition unit 52. The processor 48 governs operation of the voice recognition unit 52 regardless of the source of the message words, i.e. from the playback circuits 41 or the memory module/card reader 50. The voice recognition unit 52 ideally should be able to follow and recognize words of continuous speech (i.e., without exaggerated pauses between words) by any person speaking the particular local language with relatively proper pronunciation. The programmed vocabulary words and recognition patterns should also be able to recognize phonetically ambiguous words, e.g. "red" and "read" in English as well as alternative pronunciations of certain words. In the case of phonetically ambiguous words, it may be necessary to establish a preference based on the experience of usage of such words or to set a flag for an operator to intervene and select a spelling of the word that appears preferable.

It should also be recognized that the voice recognition at the printer of the present invention may be implemented and used at the same time that cameras with on-board voice recognition of the type described in the above referenced (Ser. No. 08/298,014) U.S. Pat. No. 5,546,145 become available and are used. The use of such a camera in conjunction with the use of voice recognition by the printer should minimize the failures to correctly recognize the words of the messages to be printed.

The recognized words of each message to be printed are assembled in the voice recognition unit 52 into the annotation to be printed. The voice recognition unit 52 also converts the characters of the words or numbers into a format usable with any conventional ink jet, laser diode or other alpha-numeric character printer 43. Any conventional alpha-numeric character printer head would be employed to print the annotation in a selected space on the image border or the back of the print paper in accordance with the present invention.

While the recording of the voice recognized messages on certain tracks of the MOF layer or in the memory module has been emphasized in certain of the above-described embodiments, it will be recognized that the analog voice message may also be separately stored and recorded in adjacent tracks or memory for a variety of reasons. For example, the notes recorded at the time of taking a photo, and later used to compose the edited message to appear as the print annotation may be retained for cross-checking. The aural notes or composed message may be retained for playback as a "sound bite" by other means in association with the prints or otherwise. The sound bites, if recorded, may also be transferred to a recording medium, e.g. a tape cassette to be provided to the user with the annotated prints made from the negatives and the recorded messages.

Figure 6:
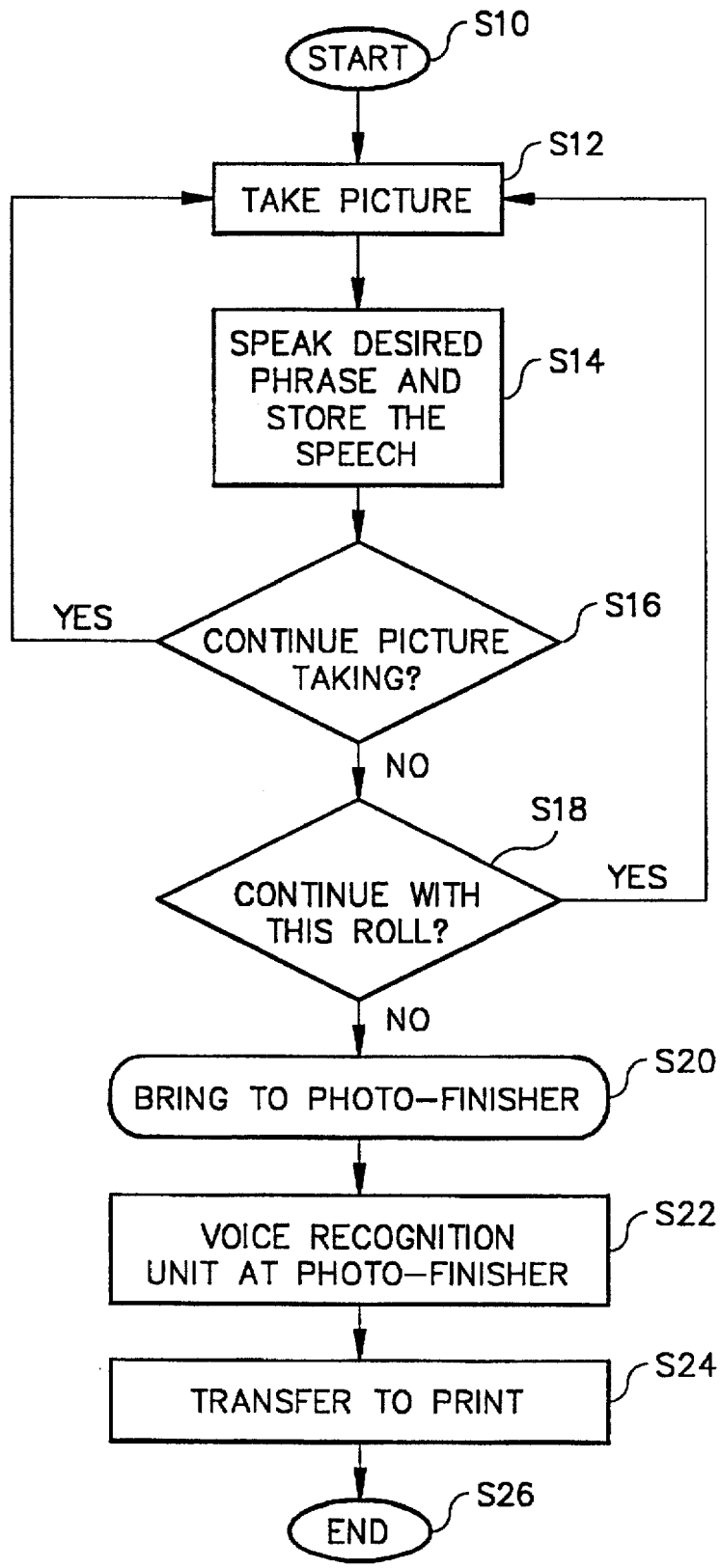
FIG. 6 is a flow chart of the recording and read out steps employing printer based voice recognition of the stored words.

FIG. 6 is a flow chart of the recording and read out steps employing printer based voice recognition of the stored words. At the start step S10, the user decides to take a picture with the camera in step S12. The camera alerts the user, or the user simply proceeds to then speak the desired phrase and store it in camera memory 26 as described above in block S14.

Following the taking of a picture and before the film strip is advanced to the next image frame by the film advance motor 29, the camera system microcontroller 23 checks the status of the memory 26. If there is audio stored in the memory, it sets the memory to the "read" mode to pass the data from the memory 26 to the film read/write interface circuits 27 or the annotation module read/write circuits 37. In the system employing the MOF layer recording technique described in reference to FIGS. 1-3, the microcontroller 23 activates motor controller 28 to cause motor 29 to initiate film advance to the next frame. The data transferred from the memory 26 to the recording interface circuits 27 is recorded on certain tracks of the MOF layer 13 during the film strip advance. Once the data is recorded on the MOF layer, microcontroller 23 sets the status of memory 26 to "empty", thus preparing the memory 26 for the next recording event.

In the embodiment of FIG. 4, it is not necessary to synchronize the storage of the image frame messages in the memory module 38 with movement of the image frames. Instead, the messages may be transferred, along with the frame identification, into the separate memory module 38 when the user indicates that each message is complete. Or the messages may be retained in memory 26 for later playback, revision and storage at any time before the memory module 38 is removed from the camera. Recording of the edited messages on the MOF layers of the filmstrip image frames may also be done at a later time by storing the user's notes in relation to each image frame in memory 26.

In steps S16 and S18, the decisions are made to continue taking pictures on the film strip in the camera. When the film strip is fully exposed or it is decided to stop taking pictures, the user provides the film strip and associated memory module (if any) or the camera to the photofinisher to invoke the transfer-to-print method in step S20.

At step S22, the voice recognition is conducted at the printer of FIG. 5 as described above. In step S24, the annotated messages are printed by printer 43 as described above. The complete print set is provided with the memory module or filmstrip and cartridge in step S26.

Thus, in the simplest use of the camera system embodiments and process described above, the annotations on the resulting prints contain messages that were recorded in association with each image frame, wherein each word of the voiced message is subjected to voice recognition at the printer.

Figure 7:
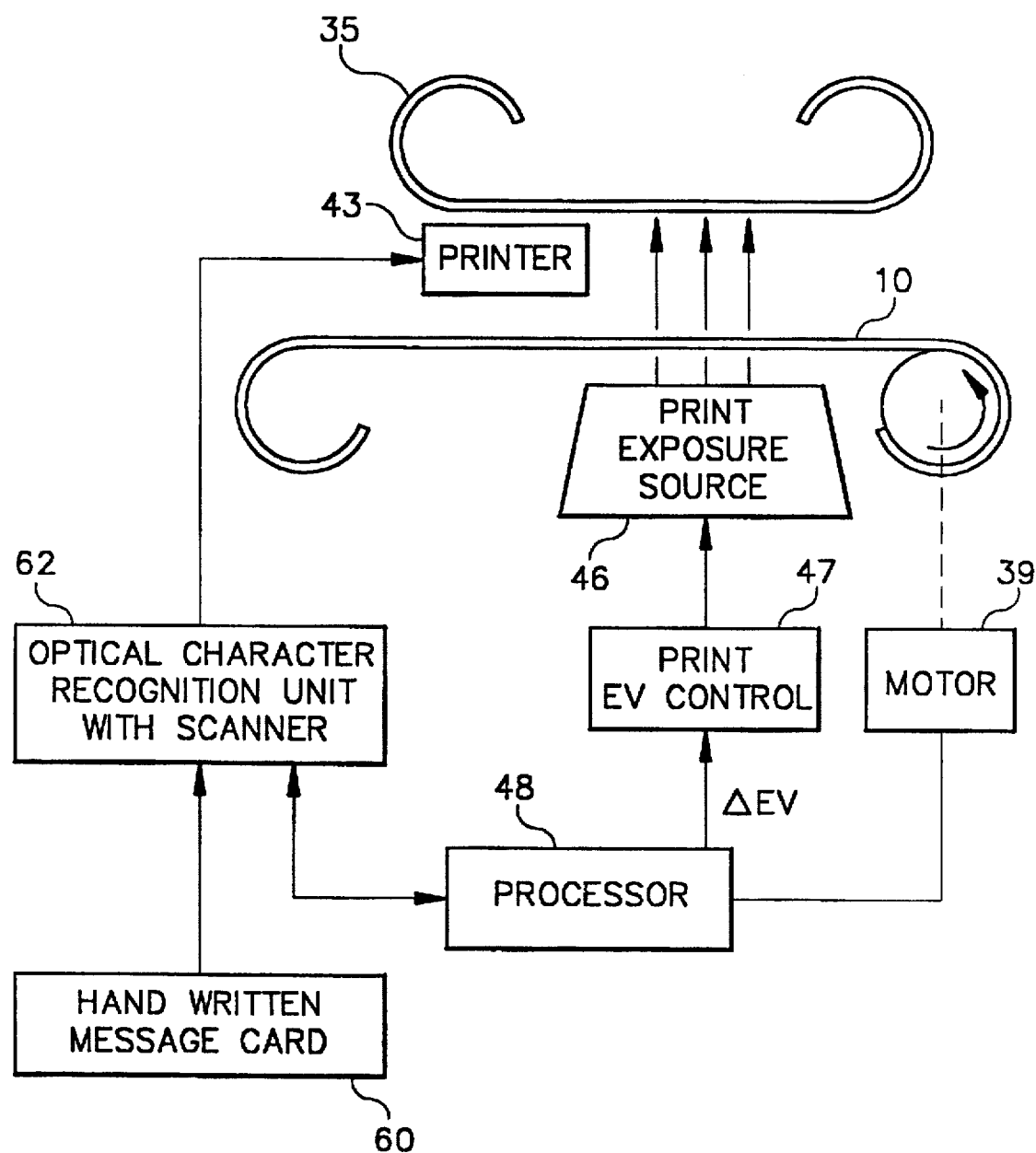
FIG. 7 is a schematic block diagram of a printing system with optical character recognition for reading out printed messages made by the user and printing the recognized words as annotations on the prints made from the image frames.
Figure 8:
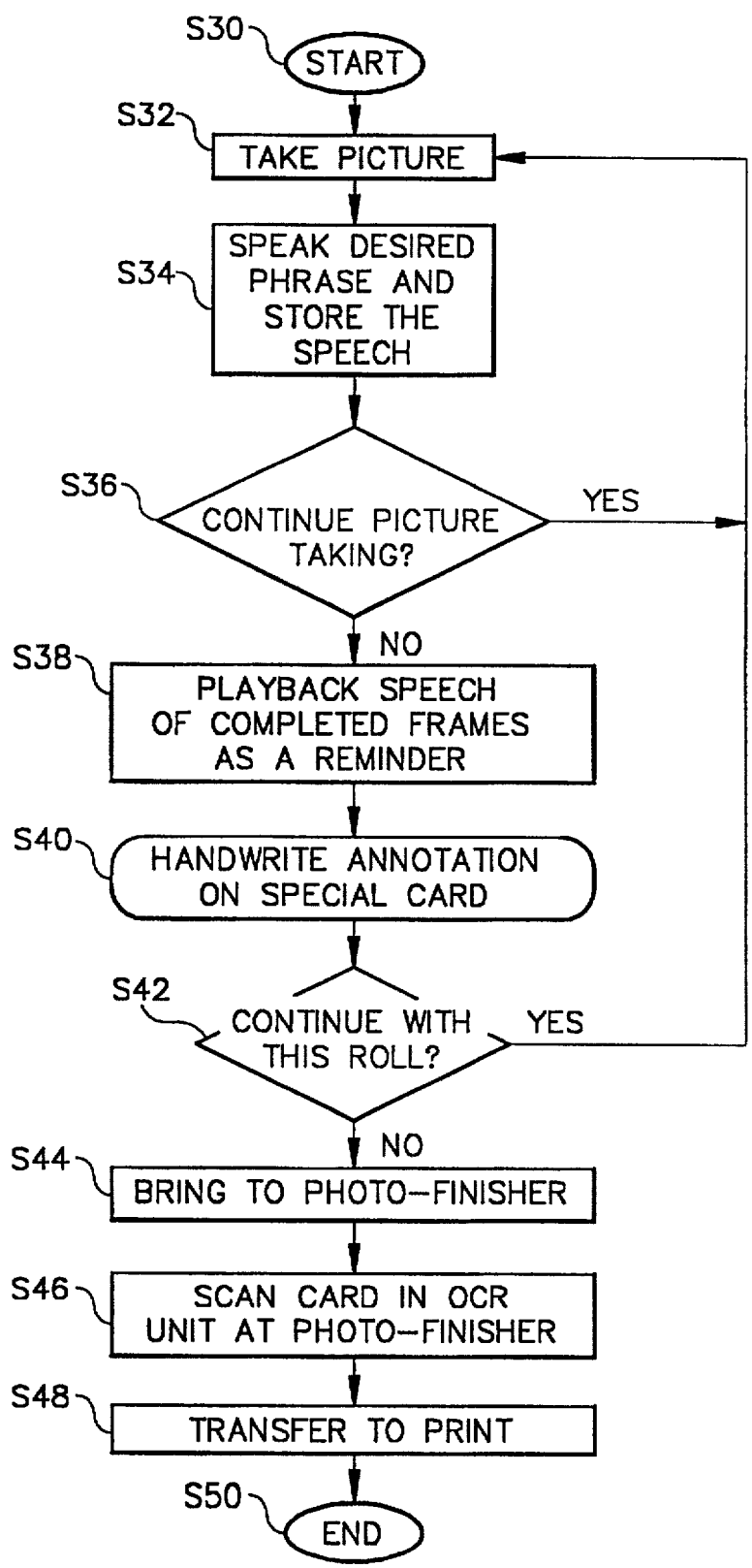
FIG. 8 is a further flow chart of the additional steps of providing printed messages optical character recognition of the word messages to the photofinisher for optical character recognition of the word messages and for separate use or for cross-checking ambiguous voice recognized words.

FIG. 7 depicts schematically a block diagram of a printing system with optical character recognition for reading out printed messages made by the user and printing the recognized words as annotations on the prints made from the image frames in a manner illustrated in the flow chart of FIG. 8. In this embodiment, the user operates the camera to play back the voice messages stored in the MOF layers or in the memory module or IC card and hand writes the messages to be printed on a special card for each image frame. The special card 60 is forwarded with the film strip and cartridge to the photofinisher, where the card 60 is put into the optical character recognition unit and scanned. The scanned message is converted to a format that can be printed, and the printer 43 prints the message as described above.

In FIG. 8, steps S30–S36 are followed in the same manner as described above with respect to steps S10–S16. When picture taking is halted, the stored messages may be played back in step S38, and the messages are edited and hand written in step S40 on the machine readable card. At step S42, when the decision is made to stop taking pictures with this film strip, the film strip in its cartridge and the hand written card are provided to the photofinisher in step S44.

In step S46, the hand written card is scanned in the optical character unit 62 to read and temporarily store the messages. Film strip identification and image frame number signals as well as synchronizing signals identifying the print exposed from the image frames are provided from the processor 48 to synchronize the printing of the messages with the respective print. The messages are successively printed in step S48, and the complete set of prints is provided to the user with the cards and film strip in step S50.

Although the present invention has been fully described with reference to the preferred embodiments thereof, many modifications and variations thereof will be apparent to those skilled in the art without departing from the spirit and scope thereof.

PARTS LIST FOR FIGS. 1–8 film strip 10
base 11
photo-chemical layers 12
virtually transparent MOF layer 13
anti-static and lubricating layer 14
perforations 15
camera 16
microphone 17
internally mounted micro-chip 18
magnetic recording head 19
miniature speaker 20
user inputs 22
camera system microcontroller 23
analog amplifier and data processing circuit 24
sound processor integrated circuit (IC) 25
on-board digital memory 26
film read/write interface circuits 27 film advance motor controller 28
film advance motor 29
LCD panel 30
message memory card 34
film cartridge 36
annotation module read/write circuits 37
message memory module 38
drive motor 39
head 40
playback circuit 41
printer 43
print exposure source 46
print EV control 47
processor 48
memory module/card reader 50
voice recognition unit 52
special card 60
OCR unit 62

We claim:

1. A photographic print making system for reproducing and recognizing voice messages stored by a user in a memory associated with image frames of a film strip to be printed, the system comprising:

means for reading the voice messages from the memory and then for reproducing the stored voice messages;

voice recognition means, connected to the means for reading and reproducing, for conducting a voice recognition of voiced words of the reproduced messages; and means, connected to the means for conducting a voice recognition, for printing the words recognized in alphanumeric characters onto photographic prints made from the image frames with which the voice messages are associated, as a printed annotation.

2. The photographic print making system of claim 1 wherein the memory comprises a virtually transparent magnetic layer on the film strip, the layer having a plurality of longitudinally extending parallel tracks therein in which the words are recorded and from which the words are reproduced.

3. The photographic print making system of claim 1 wherein:

the film strip is attached at one end to a film strip cartridge and is adapted to be enclosed within the cartridge upon completion of exposure of all image frames for removal from a camera for transfer to a photofinisher to make prints therefrom; and the memory comprises a memory module associated with the film strip cartridge for storing words of the voice messages.

4. The photographic print making system of claim 1 wherein:

the memory comprises a memory module associated with a film strip cartridge for storing words of the voice messages.

5. A photographic print making method for reproducing and recognizing voice messages stored by a user in a memory associated with image frames of a film strip to be printed, the method comprising steps of:

reading the voiced messages from the memory and then reproducing the stored voice messages;

in response to the reproducing, conducting voice recognition of voiced words of the reproduced messages; and in response to the conducting voice recognition, printing the words recognized in alphanumeric characters onto photographic prints made from the image frames with which the voice messages are associated, as a printed annotation.

6. The method of claim 5 wherein:

the memory comprises a virtually transparent magnetic layer on the film strip, the layer having a plurality of longitudinally extending parallel tracks therein in which the words are recorded with respect to the image frames; and the reproducing step comprises magnetically reproducing the words recorded in the tracks with respect to each image frame.

7. The method of claim 5 wherein:

the film strip is attached at one end to a film strip cartridge and is adapted to be enclosed within the cartridge upon completion of exposure of all image frames for removal from a camera for transfer to a photofinisher to make prints therefrom;

the memory comprises a memory module associated with the film strip cartridge for storing words of the voice messages in discrete memory locations; and the reproducing step comprises reading out the words recorded in the discrete memory locations associated with the image frames.

8. The method of claim 5 wherein:

the memory comprises a memory module associated with a film strip cartridge for storing words of the voice messages in discrete memory locations; and the reproducing step comprises reading out the words recorded in the discrete memory locations associated with the image frames.

9. A photographic system including a camera adapted to make exposures of image frames of a film strip and to store voice messages in a memory associated with the image frames so that both the film strip and memory are provided to a photofinisher for processing and printing, and a printer for accurately recognizing the stored messages and printing annotations on prints made from the associated image frames, the system further comprising:

in the camera, speech input means into which a camera user may voice words of the message to be stored with respect to the image frames; and means for storing the voiced words in relation to the image frames in the memory; and in the printer, means for providing reference voiced words corresponding to a reference word vocabulary;

means for reading out the stored voiced words from the memory;

voice recognition means for comparing the read out voiced words to the reference voiced words and for recognizing reference vocabulary words corresponding to the read out voiced words; and means for printing alphanumeric characters of the recognized vocabulary words onto photographic prints made from the associated image frames, as printed annotations.

10. The photographic system of claim 9 wherein the memory comprises a virtually transparent magnetic layer on the film strip, the layer having a plurality of longitudinally extending parallel tracks therein in which the voiced words are recorded and from which the voiced words are reproduced.

11. The photographic system of claim 9 wherein:

the film strip is attached at one end to a film strip cartridge and is adapted to be enclosed within the cartridge upon completion of exposure of all image frames for removal from the camera for transfer to a photofinisher to make prints therefrom; and the memory comprises a memory module associated with the film strip cartridge for storing the voiced words of the voice messages.

12. The photographic system of claim 9 wherein:

the memory comprises a memory module associated with a film strip cartridge for storing words of the voice messages.

13. The photographic system of claim 9 wherein:

the camera further comprises sound processing means for processing the words spoken into the speech input means to digitize the voiced words and store the digitized voice words in the memory.

14. The photographic system of claim 9 wherein the camera sound processing means further comprises:

means for temporarily storing voiced words related to the image frames;

means for audibly reproducing the stored words on command of the user to enable the composition of a message to be stored for reproduction with the prints made by the printer upon recognition of the stored words; and means for storing the composed message in the memory.

15. A photographic method employing a camera adapted to make exposures of image frames of a film strip and to store voice messages in a memory associated with the image frames so that both the film strip and memory are provided to a photofinisher for processing and printing, and a printer for accurately recognizing the stored messages and printing annotations on prints made from the associated image frames, the method further comprising steps of:

in use of the camera, speaking words of the message to be recorded for reproduction as an annotation of the print made from each image frame into a camera sound recording unit; and in the camera, storing the voiced words in relation to the image frames in the memory;

providing the film strip and the memory to the photofinisher to make prints from the image frames on a photographic printer; and in the printer, providing reference voiced words corresponding to a reference word vocabulary;

reading out the stored voiced words from the memory;

comparing the read out voiced words to the reference voiced and recognizing reference vocabulary words corresponding to the read out voiced words; and printing alpha numeric characters of the recognized vocabulary words onto photographic prints made from the associated image frames, as printed annotations.

16. The method of claim 15 further comprising steps of:

during use of the camera to take photographs, speaking notes related to the image frames exposed into the camera sound recording unit for temporary storage; and at a later time, playing back the spoken notes, composing the words of the message to be recorded for reproduction as an annotation on the print made from each image frame, and speaking the composed words of the message for storage in the memory into the camera sound recording unit.

* * * * *